(12) United States Patent
Hsu

(10) Patent No.: US 9,957,994 B2
(45) Date of Patent: May 1, 2018

(54) SCREW

(71) Applicant: Kuo-Tai Hsu, Tainan (TW)

(72) Inventor: Kuo-Tai Hsu, Tainan (TW)

( * ) Notice: Subject to any disclaimer, the term of this patent is extended or adjusted under 35 U.S.C. 154(b) by 59 days.

(21) Appl. No.: 15/163,719

(22) Filed: May 25, 2016

(65) Prior Publication Data

US 2017/0343029 A1  Nov. 30, 2017

(51) Int. Cl.
*F16B 25/10* (2006.01)
*F16B 25/00* (2006.01)

(52) U.S. Cl.
CPC ............ *F16B 25/103* (2013.01); *F16B 25/00* (2013.01); *F16B 25/0052* (2013.01)

(58) Field of Classification Search
CPC .. F16B 25/00; F16B 25/0036; F16B 25/0052; F16B 25/0057; F16B 25/0084; F16B 25/103
USPC ............. 411/386, 387.7, 87.8, 412, 424, 417
See application file for complete search history.

(56) References Cited

U.S. PATENT DOCUMENTS

| | | | |
|---|---|---|---|
| 4,697,969 A | 10/1987 | Sparkes | |
| 5,273,383 A * | 12/1993 | Hughes | F16B 25/0015 411/180 |
| 6,789,991 B2 * | 9/2004 | Hsu | F16B 25/0031 411/311 |
| 8,360,702 B2 * | 1/2013 | Yu | F16B 25/0015 411/386 |
| 8,382,414 B2 * | 2/2013 | Vandenberg | F16B 25/0015 411/386 |
| 8,480,342 B2 * | 7/2013 | Stiebitz | F16B 25/0015 411/386 |
| 8,616,816 B2 * | 12/2013 | Pieciak, Jr. | F16B 25/00 411/387.2 |
| 8,926,249 B2 * | 1/2015 | Lin | F16B 25/0057 411/386 |
| 2006/0285940 A1 * | 12/2006 | Walther | F16B 25/0026 411/421 |
| 2007/0166124 A1 | 7/2007 | Hsu | |
| 2007/0286701 A1 | 12/2007 | Hsu | |

(Continued)

FOREIGN PATENT DOCUMENTS

| | | |
|---|---|---|
| DE | 202009015108 U1 | 1/2010 |
| EP | 0281203 A1 | 9/1988 |

(Continued)

*Primary Examiner* — Roberta S Delisle
(74) *Attorney, Agent, or Firm* — Alan D. Kamrath; Kamrath IP Lawfirm, P.A.

(57) ABSTRACT

A screw includes a shank, a first thread, and a second thread. The shank includes a screw-in portion, a head portion, and a straight rod portion between the screw-in portion and the head portion. The first thread surrounds the shank spirally and includes an upper thread portion formed around the straight rod portion, a lower thread portion formed around the screw-in portion, and a middle thread portion continuously connected between the upper and lower thread portions. A plurality of serrate cutting teeth is provided on the middle thread portion of the first thread. The second thread is helically formed around the screw-in portion of the shank and includes a plurality of thread convolutions spaced from thread convolutions of the lower thread portion of the first thread. The screw can be quickly driven into articles to be joined without degradation of binding capacity between the screw and the articles.

9 Claims, 7 Drawing Sheets

(56) References Cited

U.S. PATENT DOCUMENTS

| | | | |
|---|---|---|---|
| 2011/0217145 A1* | 9/2011 | Kochheiser | B23P 11/00 411/412 |
| 2013/0011214 A1* | 1/2013 | Lin | F16B 25/0015 411/387.4 |
| 2013/0039720 A1* | 2/2013 | Shih | F16B 25/0047 411/387.4 |

FOREIGN PATENT DOCUMENTS

| | | |
|---|---|---|
| EP | 1881209 A1 | 1/2008 |
| GB | 2359603 A | 8/2001 |
| TW | M339599 U | 9/2008 |

* cited by examiner

SCREW

BACKGROUND OF THE INVENTION

1. Field of the Invention

The present invention relates to a screw and, more particularly, to a fast-tapping screw which is driven quickly by an operator applying less force.

2. Description of the Related Art

Large amount of wood or compound wooden materials mixed and compressed from plastic resin and wood chips are used to produce wooden articles for furniture, decoration and construction, and screws are often used in connection with wooden articles together. A conventional screw generally includes a shank and at least one thread formed on the shank, so that the screw can be screwed into the articles which need to be fastened or interlocked. However, frictional resistance obviously exists between the screw thread of a conventional screw and an article in which the screw is contiguously driven, costing an operator's strength and time. Moreover, waste chips severed by thread convolutions and not removed smoothly in a cutting process impede and decelerate movement of a screw inside an article and cause the article under compression of an operator's strength to chap probably.

BRIEF SUMMARY OF THE INVENTION

Thus, an objective of the present invention is to provide a screw, which can be driven into an article such as plank smoothly and quickly by an operator applying less force and is characteristic of successful removals of waste chips created in a process of driving the screw for less friction.

To achieve this and other objectives, a screw of the present invention includes a shank, a first thread, and a second thread. The shank includes a tapered screw-in portion, a head portion spaced from the screw-in portion along a longitudinal axis of the shank, and a straight rod portion between the screw-in portion and the head portion. The first thread is helically formed on an outer circumference of the shank and includes an upper thread portion formed around the straight rod portion, a lower thread portion formed around the screw-in portion, and a middle thread portion continuously connected between the upper and lower thread portions. The middle thread portion is formed around the straight rod portion adjacent to the screw-in portion. A lower end of the lower thread portion extends to a tip of the screw-in portion for development of a cutting set point. The second thread is helically formed on an outer circumference of the screw-in portion of the shank and includes a plurality of thread convolutions which are spaced from thread convolutions of the lower thread portion. A pitch of two adjacent thread convolutions of the second thread is approximately equal to a pitch of two adjacent thread convolutions of the lower thread portion of the first thread.

In a preferred form, the straight rod portion includes a lower segment adjacent to the screw-in portion and an upper segment adjacent to the head portion. The upper segment has an outer diameter slightly greater than an outer diameter of the lower segment. The middle thread portion surrounds the lower segment of the straight rod portion adjacent to the screw-in portion, and a thread outer diameter of the upper thread portion is slightly greater than a thread outer diameter of the middle thread portion.

In a preferred form, a plurality of serrate cutting teeth is provided on each thread convolution of the middle thread portion of the first thread. A helix angle of the thread convolution of the upper thread portion relative to the longitudinal axis is greater than a helix angle of the thread convolution of the lower thread portion relative to longitudinal axis, and the helix angle of the thread convolution of the lower thread portion relative to longitudinal axis is between 55 and 65 degrees. The middle thread portion includes a plurality of thread convolutions, and a thread angle of the thread convolution of the middle thread portion is between 53 and 57 degrees.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

DETAILED DESCRIPTION OF THE INVENTION

Figure 1:
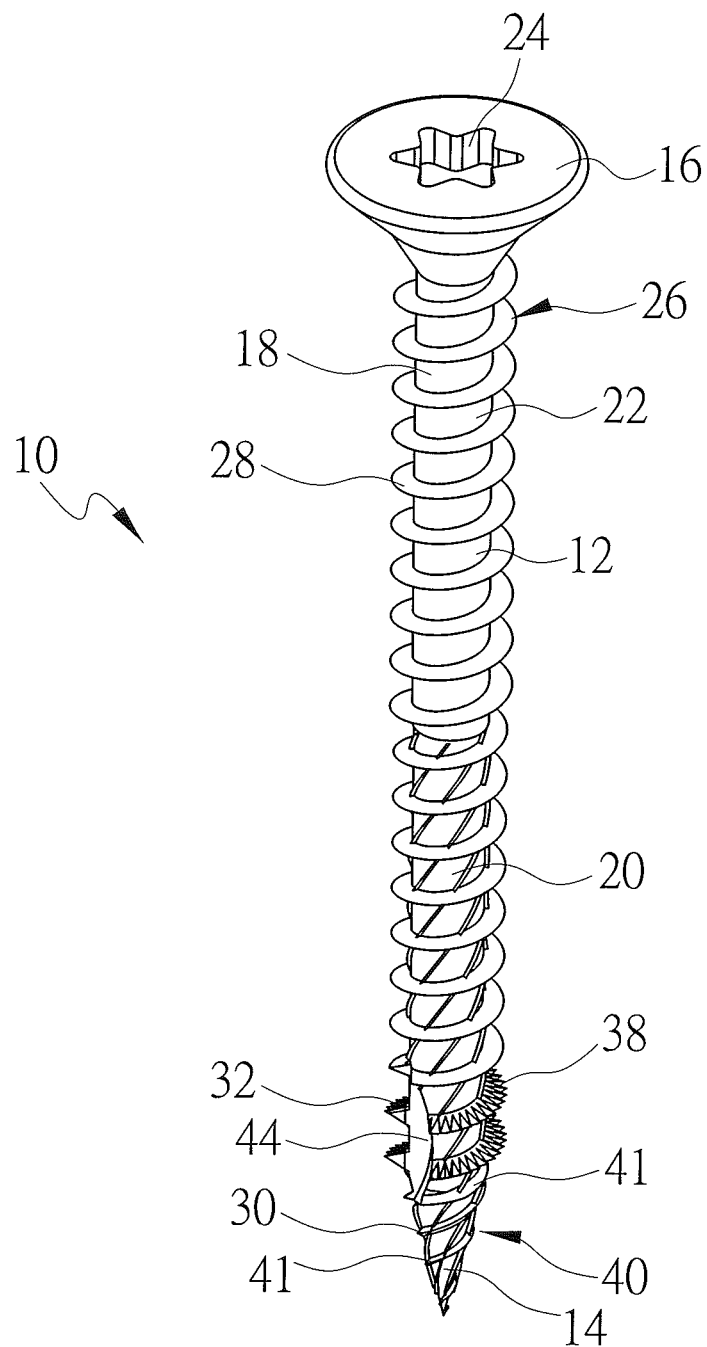
FIG. 1 is a perspective view of a screw in accordance with an embodiment of the present invention.
Figure 2:
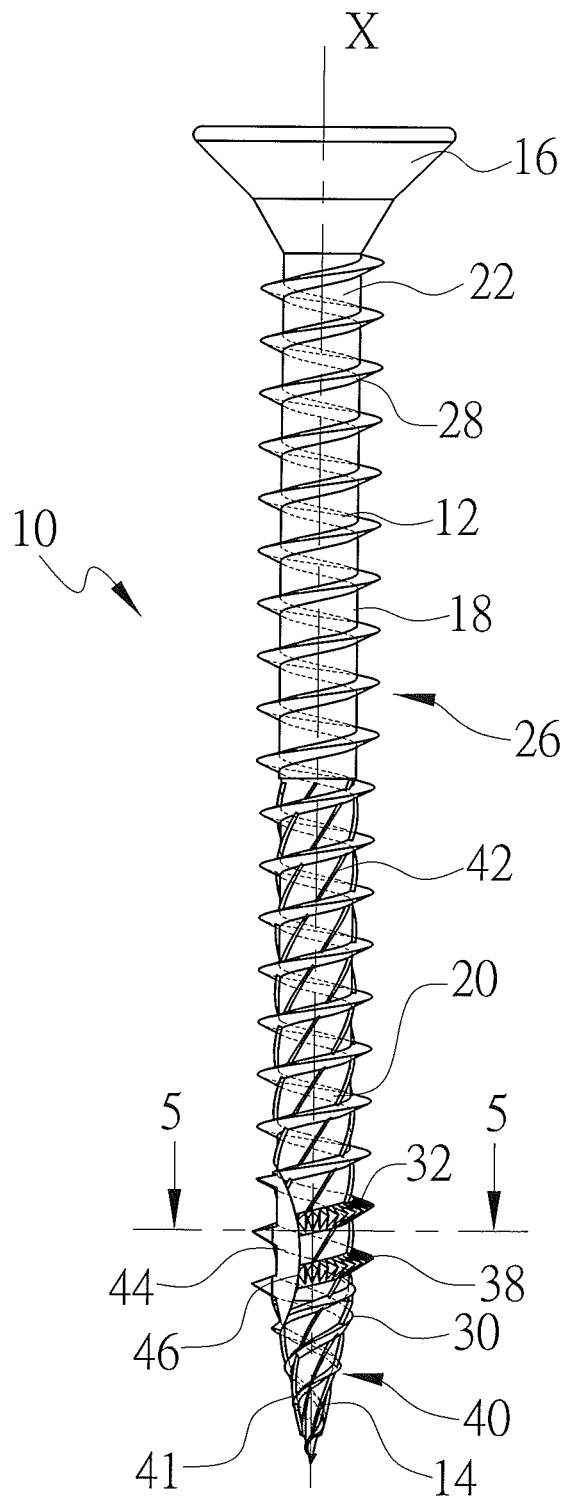
FIG. 2 is a front view of the screw of FIG. 1.

A screw according to the present invention is shown in FIGS. 1 through 7 of the drawings and generally designated 10. The screw 10 includes a shank 12 having a screw-in portion 14, a head portion 16 spaced from the screw-in portion 14 along a longitudinal axis (X) of the shank 12, and a straight rod portion 18 between the screw-in portion 14 and the head portion 16. The screw-in portion 14 has a tapered section with an included angle (A) between 20 and 30 degrees (25 degrees preferably) at a tip thereof. The straight rod portion 18 includes a lower segment 20 adjacent to the screw-in portion 14 and an upper segment 22 adjacent to the head portion 16. The upper segment 22 has an outer diameter (D1) slightly greater than an outer diameter (D2) of the lower segment 20 (see FIG. 6). The head portion 16 with an outer diameter greater than the diameter of the shank 12 is provided with a socket 24 in a top surface thereof for holding a screw driver (not shown in figures).

The screw 10 further includes a continuous first thread 26 helically formed on an outer circumference of the shank 12. The first thread 26 includes an upper thread portion 28, a lower thread portion 30, and a middle thread portion 32. The upper thread portion 28 surrounds around the straight rod portion 18, the lower thread portion 30 surrounds around the screw-in portion 14 of the shank 12, and the middle thread portion 32 surrounds the lower segment 20 of the straight rod portion 18 adjacent to the screw-in portion 14 and is continuously connected between the upper thread portion 28 and the lower thread portion 30. A lower end of the lower thread portion 30 extends to the tip of the screw-in portion 14 for development of a cutting set point 34 (see FIG. 4).

Figure 3:
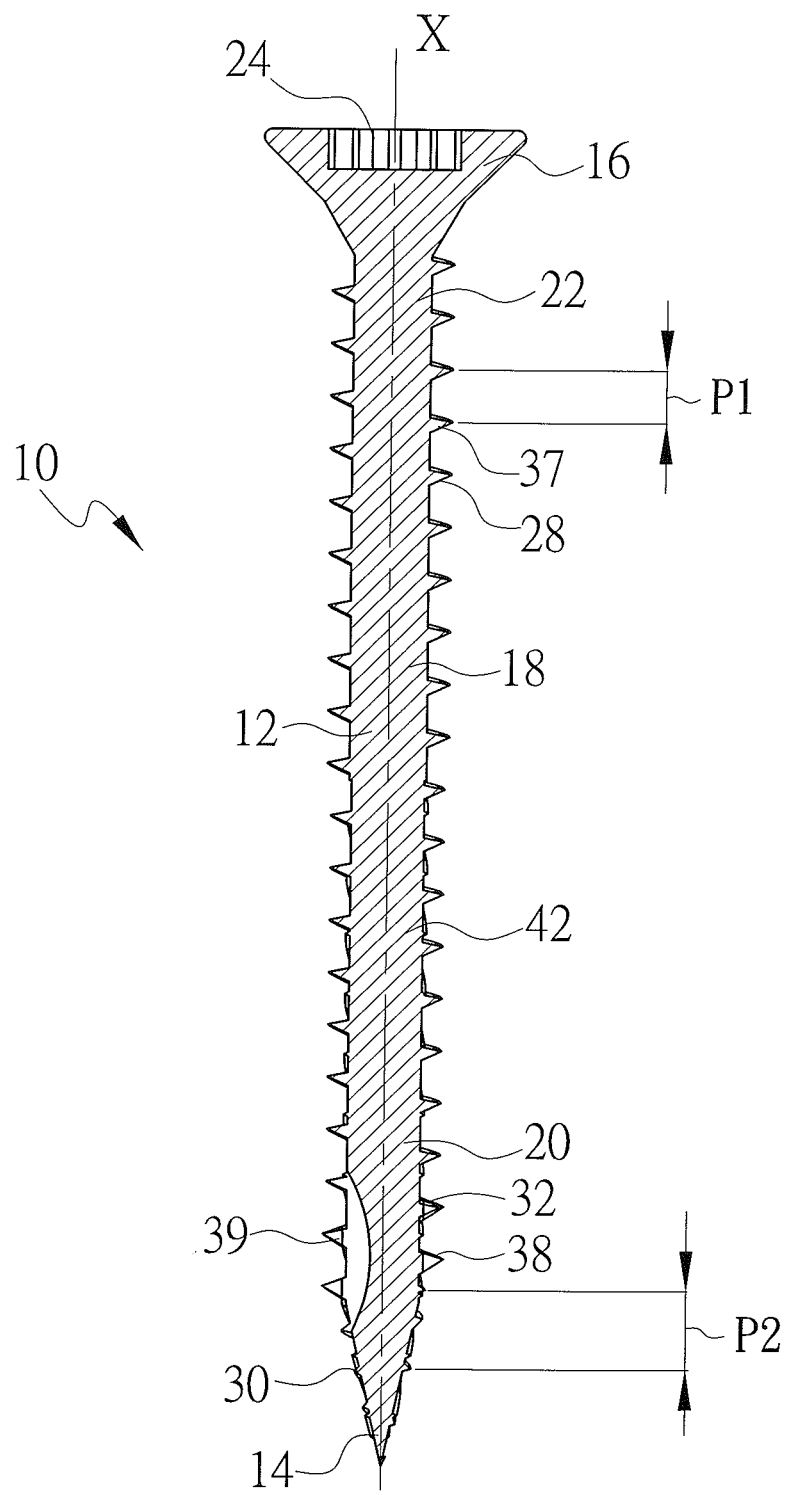
FIG. 3 is a sectional view illustrating the lengthwise section of the screw in FIG. 1.
Figure 4:
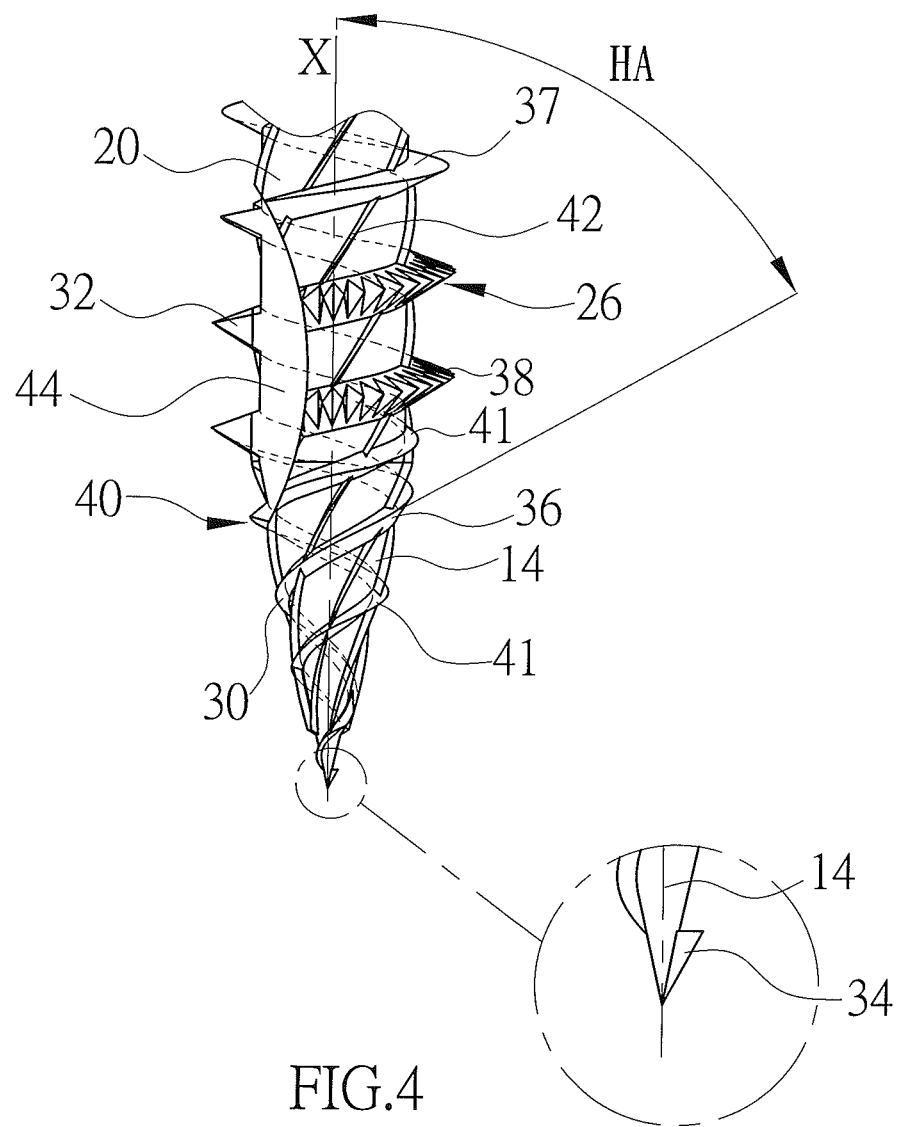
FIG. 4 is a partial, enlarged view of the screw of FIG. 1.
Figure 5:
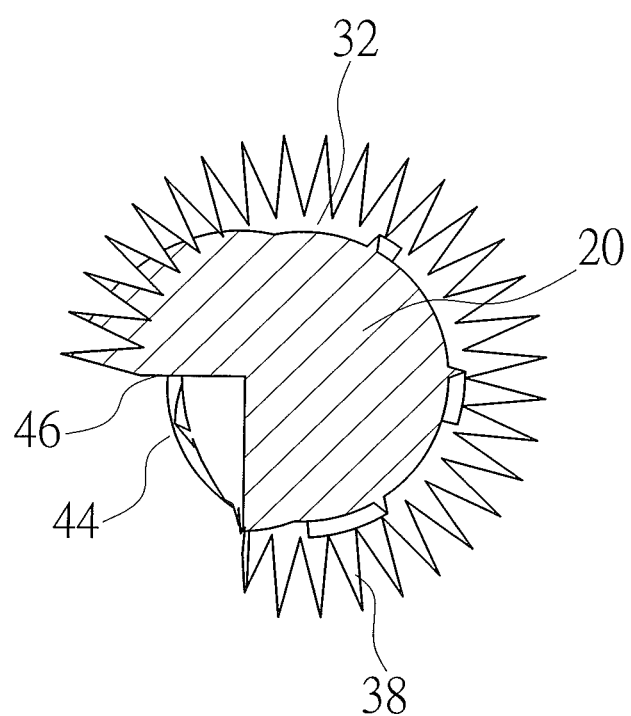
FIG. 5 is a sectional view taken along line 5-5 of FIG. 2.
Figure 6:
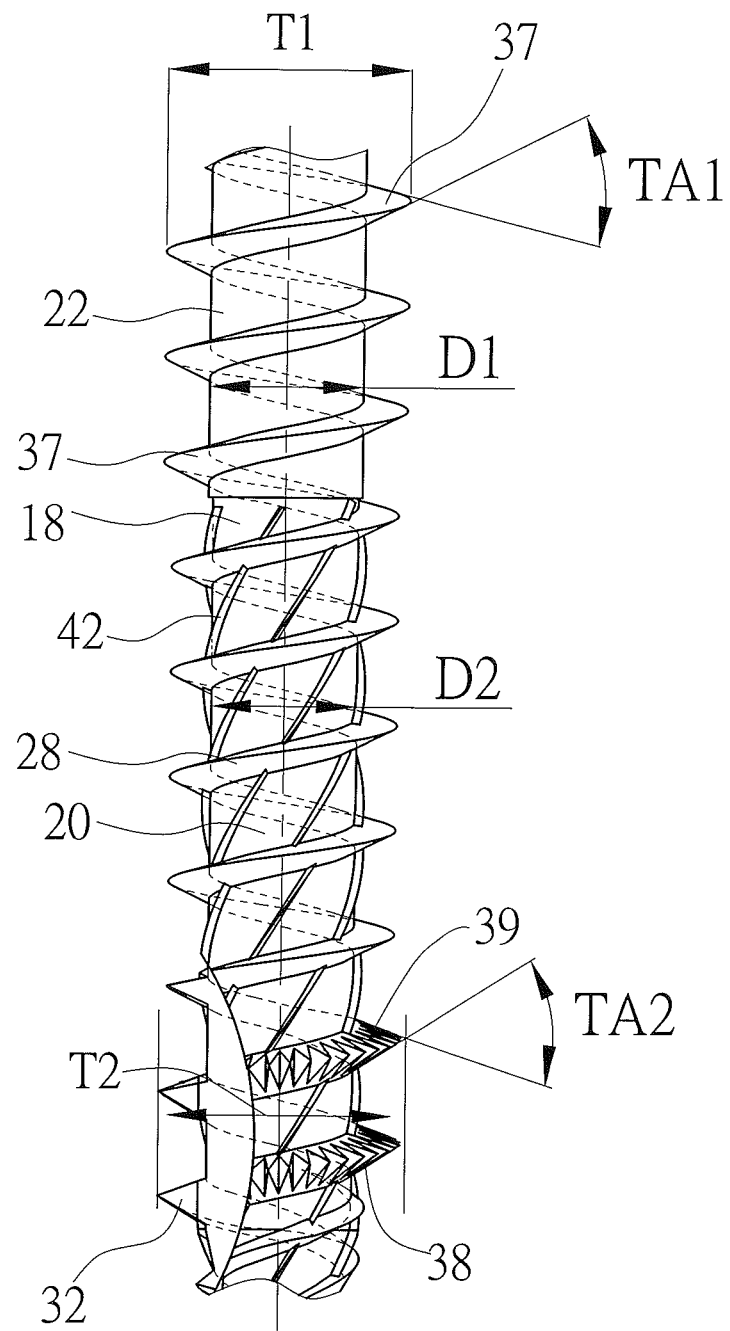
FIG. 6 is a partial, enlarged view of the screw of FIG. 2.
Figure 7:
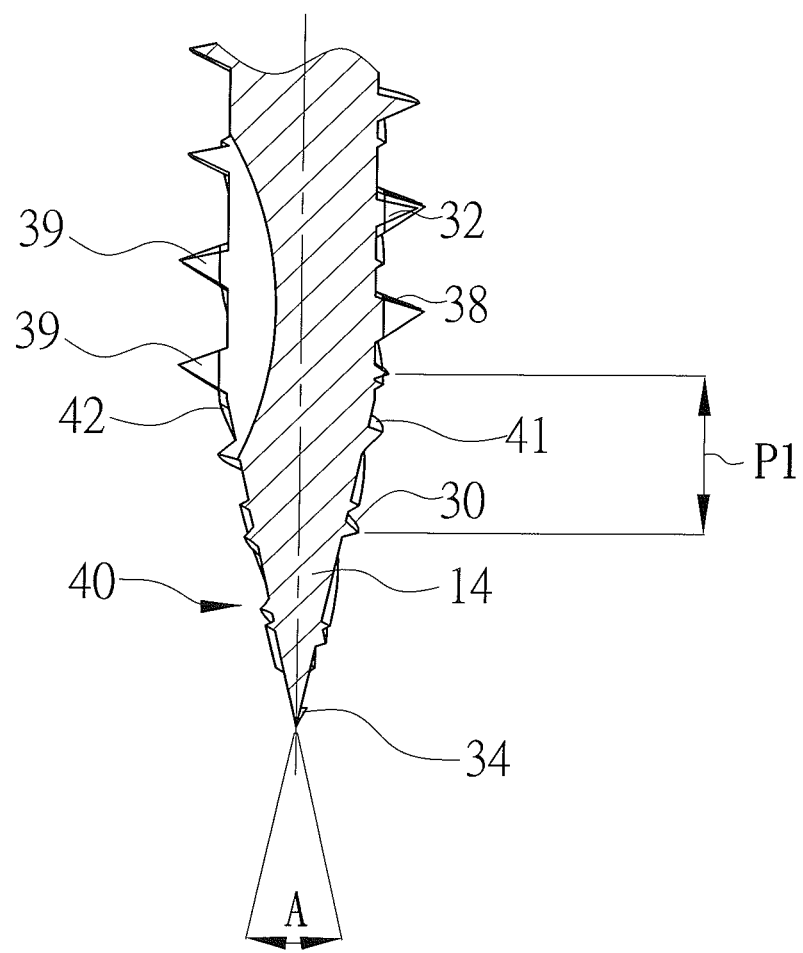
FIG. 7 is a sectional view illustrating the lengthwise section of the screw in FIG. 4.

In this embodiment, the upper thread portion 28 includes a plurality of asymmetrical thread convolutions 37, and the middle thread portion 32 includes two thread convolutions 39, as shown in FIG. 6 and FIG. 7. The thread angle (TA1) of the thread convolution 37 of the upper thread portion 28 is between 35 and 45 degrees, and the thread angle (TA2) of the thread convolution 37 of the middle thread portion 32 is between 53 and 57 degrees. Moreover, the thread outer diameter (T1) of the upper thread portion 28 is slightly greater than the thread outer diameter (T2) of the middle thread portion 32. Furthermore, a plurality of serrate cutting teeth 38 with inclined helical angles is provided on each thread convolution 39 of the middle thread portion 32 for better cutting force of the first thread 26. As shown in FIG. 3, two adjacent thread convolutions 37 of the upper thread portion 28 form a first pitch (P1), and two adjacent thread convolutions of the lower thread portion 30 form a second pitch (P2). The second pitch (P2) is slightly greater than the first pitch (P1). Further, a helix angle of the thread convolution 37 of the upper thread portion 28 relative to the longitudinal axis (X) is greater than a helix angle of the thread convolution of the lower thread portion 30 relative to longitudinal axis (X). Referring to FIG. 4, each thread convolution of the lower thread portion 30 has a cutting face 36 at a screw-in side (facing the tip of the screw-in portion 14), and a helix angle (HA) of the cutting face 36 of the lower thread portion 30 is preferably between 55 and 65 degrees.

The screw 10 further includes a second thread 40 helically formed on an outer circumference of the screw-in portion 14 of the shank 12. The second thread 40 includes a plurality of thread convolutions 41 which are spaced from and parallel to thread convolutions of the lower thread portion 30, and the pitch of two adjacent thread convolutions 41 of the second thread 40 is approximately equal to the pitch (P2) of two adjacent thread convolutions of the lower thread portion 30. The helix angle of the thread convolution 41 relative to the longitudinal axis (X) is approximately equal to the helix angle (HA) of the thread convolution of the lower thread portion 30 (see FIG. 4). Because the bottom of the second thread 40 is not extended to the tip of the screw-in portion 14, there is only one cutting set point 34 at the tip of the screw-in portion 14 of the shank 12.

The screw 10 further includes a plurality of oblique ribs 42 and at least one chip-collected groove 44. The ribs 42 are formed on the outer circumference of the shank 12 and parallel to and spaced from one another, and each of the ribs 42 is designed between two adjacent thread convolutions on the screw-in portion 14 and the lower segment 20 of the straight rod portion 18 for better removals of chips. Each of the ribs 42 is less than the thread convolution of the first thread 26 in height. The chip-collected groove 44 is designed in the lower segment 20 of the straight rod portion 18 along the longitudinal axis (X) and near the screw-in portion 14 for holing waste chips. The chip-collected groove 44 includes two side edges 46 for an auxiliary cutting function.

In practice, the screw 10 is inserted into an article such as plank with the cutting set point 34 at the tip of the screw-in portion 14, and both the lower thread portion 30 of the first thread 26 and the second thread 40 on the screw-in portion 14 are screwed into the article and cut the article at the same time while moving inside the article. The waste chips severed by the first and second threads 26 and 40, both of which are driven into the article, are guided by oblique ribs 42 and removed upward for reducing resistance against the screw 10 in the screw-in direction and increasing a driving speed. Then, the cutting teeth 38 on the middle thread portion 32 of the straight rod portion 18, which has been driven into the article, assist the screw 10 in cutting the article for less force applied by an operator. Waste chips extruded by the ribs 42 can be held in the chip-collected groove 44 and pitch spaces between thread convolutions on the lower segment 20 of the straight rod portion 18 but not accumulated in the upper segment 22 of the straight rod portion 18. As such, the upper segment 22 of the screw 10 will be smoothly driven into but not fracture the article assembled.

The screw 10 of the present invention has advantages as follows:

1. The screw-in portion 14 is provided with dual screw threads (the lower thread portion 30 of the first thread 26 and the second thread 40) and one cutting set point 34, and the helix angle of the lower thread portion 30 relative to the longitudinal axis (X) is smaller than that of the upper thread portion 28 relative to longitudinal axis (X) for a faster driving speed of the screw 10.

2. The middle thread portion 32 features the thread angle (TA2) greater than the thread angle (TA1) of the upper thread portion 28 and is provided with cutting teeth 38 for increased cutting force of the screw 10.

3. The upper thread portion 28 features the thread outer diameter (T1) slightly greater than the thread outer diameter (T2) of the middle thread portion 32, so that force to engage with a plank strongly by thread crests of the upper thread portion 28 on the upper segment 22 enhances anchoring strength.

4. Waste chips created in the course of cutting the article are guided by the ribs 42 and removed from the chip-collected groove 44 and the pitch spaces between thread convolutions on the lower segment 20 of the straight rod portion 18 for lowered resistance against the screw 10 in the driving direction and less force applied by an operator.

The scope of the invention is to be indicated by the appended claims, rather than by the foregoing description, and all changes which come within the meaning and range of equivalency of the claims are intended to be embraced therein.

The invention claimed is:

1. A screw comprising:
    a shank including a tapered screw-in portion, a head portion spaced from the screw-in portion along a longitudinal axis of the shank, and a straight rod portion between the screw-in portion and the head portion;
    a first thread helically formed on an outer circumference of the shank and including an upper thread portion formed around the straight rod portion, a lower thread portion formed around the screw-in portion, and a middle thread portion continuously connected between the upper and lower thread portions, with the middle thread portion formed around the straight rod portion adjacent to the screw-in portion, with a lower end of the lower thread portion extending to a tip of the screw-in portion for development of a cutting set point; and
    a second thread helically formed on an outer circumference of the screw-in portion of the shank and including a plurality of thread convolutions which are spaced from thread convolutions of the lower thread portion, with a pitch of two adjacent thread convolutions of the second thread being approximately equal to a pitch of two adjacent thread convolutions of the lower thread portion of the first thread.

2. The screw according to in claim 1, wherein the straight rod portion includes a lower segment adjacent to the screw-in portion and a upper segment adjacent to the head portion, with the upper segment having an outer diameter slightly greater than an outer diameter of the lower segment, with the middle thread portion surrounding the lower segment of the straight rod portion adjacent to the screw-in portion, with a thread outer diameter of the upper thread portion being slightly greater than a thread outer diameter of the middle thread portion.

3. The screw according to claim 2, wherein the upper thread portion of the first thread includes a plurality of asymmetrical thread convolutions, with a thread angle of the thread convolution of the upper thread portion being between 35 and 45 degrees, with the middle thread portion including a plurality of thread convolutions, with a thread angle of the thread convolution of the middle thread portion being between 53 and 57 degrees.

4. The screw according to claim 3, wherein a plurality of serrate cutting teeth is provided on each thread convolution of the middle thread portion of the first thread.

5. The screw according to claim 2, further comprising:
a plurality of oblique ribs formed on the outer circumference of the shank and designed between two adjacent thread convolutions on the screw-in portion and the lower segment of the straight rod portion.

6. The screw according to claim 2, further comprising:
at least one chip-collected groove designed in the lower segment of the straight rod portion along the longitudinal axis and near the screw-in portion.

7. The screw according to claim 1, wherein the second thread does not extend to the tip of the screw-in portion of the shank.

8. The screw according to claim 1, wherein a helix angle of the thread convolution of the upper thread portion relative to the longitudinal axis is greater than a helix angle of the thread convolution of the lower thread portion relative to longitudinal axis, with the helix angle of the thread convolution of the lower thread portion relative to longitudinal axis being between 55 and 65 degrees.

9. The screw according to claim 8, wherein a helix angle of the thread convolution of the second thread relative to the longitudinal axis is approximately equal to the helix angle of the thread convolution of the lower thread portion.

* * * * *